(12) United States Patent
Bannon et al.

(10) Patent No.: US 11,926,442 B2
(45) Date of Patent: Mar. 12, 2024

(54) MULTIPLE FUNCTION SPACECRAFT SUNSHADE SYSTEMS AND METHODS

(71) Applicant: Ball Aerospace & Technologies Corp., Boulder, CO (US)

(72) Inventors: Erika Thorson Bannon, Boulder, CO (US); Kevin Eugene Weed, Boulder, CO (US); John Scott Knight, Longmont, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 238 days.

(21) Appl. No.: 17/224,863

(22) Filed: Apr. 7, 2021

(65) Prior Publication Data

US 2022/0324591 A1    Oct. 13, 2022

(51) Int. Cl.
*B64G 1/54* (2006.01)
*B64G 1/44* (2006.01)
*B64G 1/58* (2006.01)

(52) U.S. Cl.
CPC ............ *B64G 1/546* (2013.01); *B64G 1/443* (2013.01); *B64G 1/58* (2013.01)

(58) Field of Classification Search
CPC ... B64G 1/54; B64G 1/56; B64G 1/58; B64G 1/443; B64G 1/44; B64G 1/546; B64G 1/50; B64G 1/503
See application file for complete search history.

(56) References Cited

U.S. PATENT DOCUMENTS

| | | | |
|---|---|---|---|
| 3,348,790 A * | 10/1967 | Crowder | B64G 1/244 244/171.8 |
| 3,840,883 A | 10/1974 | Choate | |
| 4,295,706 A | 10/1981 | Frost | |
| 4,598,981 A | 7/1986 | Hallam et al. | |
| 4,725,023 A | 2/1988 | Shiki | |

(Continued)

FOREIGN PATENT DOCUMENTS

| | | | |
|---|---|---|---|
| CN | 1308581 A * | 8/2001 | ............. B64G 1/503 |
| DE | 202013011346 | 1/2014 | |

(Continued)

OTHER PUBLICATIONS

"Space-Based Infrared System (SBIRS)," GlobalSecurity.org, 2002, 3 pages [retrieved online from: https://www.globalsecurity.org/military/library/budget/fy2001/dot-e/airforce/01sbirs.html].

(Continued)

*Primary Examiner* — Philip J Bonzell
*Assistant Examiner* — Ashesh Dangol
(74) *Attorney, Agent, or Firm* — Sheridan Ross P.C.

(57) ABSTRACT

A spacecraft sunshade is provided. The sunshade includes a surface that is maintained in a sun facing orientation. Adjustments to a position of the sunshade are made in a plane that is transverse to a line of sight to the sun, in order to block sunlight from being directly incident on an instrument associated with the spacecraft. The sunshade can include photovoltaic elements on the sun-facing surface of the sunshade. In addition, the sunshade can be formed from an opaque material, and further from a material that absorbs heat from the sun and reradiate that heat to the instrument. The sunshade can perform stray light blocking, electrical power generation, and radiational heating functions.

24 Claims, 9 Drawing Sheets

(56) References Cited

U.S. PATENT DOCUMENTS

| | | | |
|---|---|---|---|
| 5,189,554 | A | 2/1993 | Vanasse et al. |
| 5,384,661 | A | 1/1995 | Geyer et al. |
| 5,526,178 | A | 6/1996 | Goldstein |
| 5,626,315 | A | 5/1997 | Flament et al. |
| 5,716,030 | A | 2/1998 | LaFiandra |
| 6,199,988 | B1 | 3/2001 | Krawczyk |
| 6,269,227 | B1 | 7/2001 | Hamasaki et al. |
| 6,443,634 | B1 | 9/2002 | Tsuboi |
| 7,166,825 | B1 | 1/2007 | Smith et al. |
| 7,631,653 | B2 | 12/2009 | Young et al. |
| 8,186,628 | B2 | 5/2012 | Gooden et al. |
| 9,815,576 | B2 | 11/2017 | Bullard |
| 10,618,677 | B1 * | 4/2020 | Wu .................. B64G 1/54 |
| 2004/0201896 | A1 | 10/2004 | Lundgren et al. |
| 2005/0174647 | A1 | 8/2005 | Fischbach et al. |
| 2009/0002823 | A1 | 1/2009 | Law et al. |
| 2009/0065647 | A1 | 3/2009 | Alis et al. |
| 2009/0205636 | A1 | 8/2009 | Gangemi |
| 2009/0320827 | A1 | 12/2009 | Thompson et al. |
| 2010/0100322 | A1 | 4/2010 | Leijtens |
| 2010/0284078 | A1 | 11/2010 | Bertuccio et al. |
| 2011/0037003 | A1 | 2/2011 | Gooden |
| 2018/0127115 | A1 * | 5/2018 | Choi ..................... B64G 1/66 |
| 2020/0173229 | A1 * | 6/2020 | Ahmed .................. H02S 30/10 |

FOREIGN PATENT DOCUMENTS

| | | |
|---|---|---|
| FR | 2776783 | 10/1999 |
| WO | WO 02/18208 | 3/2002 |

OTHER PUBLICATIONS

Clampin et al. "The Advanced Camera for Surveys," STSCI, Science with the Hubble Space Telescope—II, 1996, 7 pages [retrieved online from: www.stsci.edu/stsci/meetings/shst2/clampinm.html].

Forman "Advanced Land Imager: Mechanical Design, Integration, and Testing," Lincoln Laboratory Journal, 2005, vol. 15, No. 2, pp. 181-196.

* cited by examiner

MULTIPLE FUNCTION SPACECRAFT SUNSHADE SYSTEMS AND METHODS

FIELD

Spacecraft sunshade systems and methods are disclosed. More particularly, systems and methods for providing a multiple function sunshade are disclosed.

BACKGROUND

Instruments deployed on satellites or other spacecraft serve as important sources of information about the universe. Such instruments typically require power to operate, and must be maintained within specific temperature ranges. In addition, instruments having sensors operating at optical wavelengths require stray light control. In order to provide required shading, configurations have been developed that provide relatively large shade structures. Other configurations have been developed that incorporate relatively small, adjustable shade structures.

Relatively large-scale sunshades that have been deployed or planned typically result in a very cold instrument. Although such solutions are suitable for instruments operated at cryogenic temperatures, they would require large amounts of power for heating for instruments operated at higher temperatures. In addition, large sunshades can be complex and can account for a large proportion of the mass budget of a spacecraft.

Relatively small shades or baffles have also been deployed or planned. For example, a small movable sunshade is discussed in U.S. Pat. No. 9,815,576. The shade in this patent is directly mounted to an enclosure for housing a sensor by a hinge and bearing arrangement that allows the shade to be rotated about the aperture of the sensor, and further to be tilted to allow the sensor to see further off axis or to block the aperture. As another example U.S. Pat. No. 8,186,628 discusses a multi-axis articulated solar light shade. The shade is in the form of a partially conical baffle tube that is rotatably attached to the base, and that includes an elongated curved portion and a visor pivotably attached to an end of the baffle.

Although various shade configurations can be effective at performing shading functions, and in particular protecting instruments from solar heating and from interference from stray light, they have been unable to perform other functions. Accordingly, it would be desirable to provide a sunshade that was relatively small, and that could perform additional functions in support of the spacecraft system.

SUMMARY

Embodiments of the present disclosure provide sunshade systems and methods that perform multiple functions. In particular, sunshade systems and methods are provided that shield an associated instrument from incident light, supply heat to the instrument, and provide electrical power to the components of the spacecraft.

A spacecraft system incorporating a sunshade in accordance with embodiments of the present disclosure generally includes a spacecraft bus, instrument, and the sunshade. The spacecraft bus can include thrusters or attitude control components, to maintain the overall spacecraft system in a desired location and alignment. The instrument can include an instrument having a line of sight that can be reoriented relative to the spacecraft bus, in order to observe or obtain data from different areas. The sunshade provides a sun facing surface that is generally normal to the sun. The sun facing surface thus creates a shadow. The position of the sunshade can be changed in order to maintain the instrument within the shadow in response to changes in the instrument orientation. In accordance with at least some embodiments of the present disclosure, movement of the sunshade is restricted to translational movement within an X-Y plane. In accordance with other embodiments, the sunshade can be rotated about various axes.

In accordance with embodiments of the present disclosure, the sunshade includes photovoltaic elements on the sun facing surface. Electrical energy produced by the photovoltaic elements can be supplied to various spacecraft system components, including but not limited to an instrument heater. In addition, the sunshade is configured to absorb energy from the sun, and to re-radiate that energy to the instrument, thereby heating the instrument. One or both of the functions of generating electricity and providing radiational heating can be combined with the basic function of the sunshade to block light. Moreover, the light blocking provided by the sunshade can operate to prevent heating of the instrument or other spacecraft system components due to direct exposure to the sun, and/or can operate to prevent stray light from degrading the performance of optical components.

Additional features and advantages of embodiments of the present disclosure will become more readily apparent from the following discussion, particularly when taken together with the accompanying drawings.

DETAILED DESCRIPTION

Figure 1:
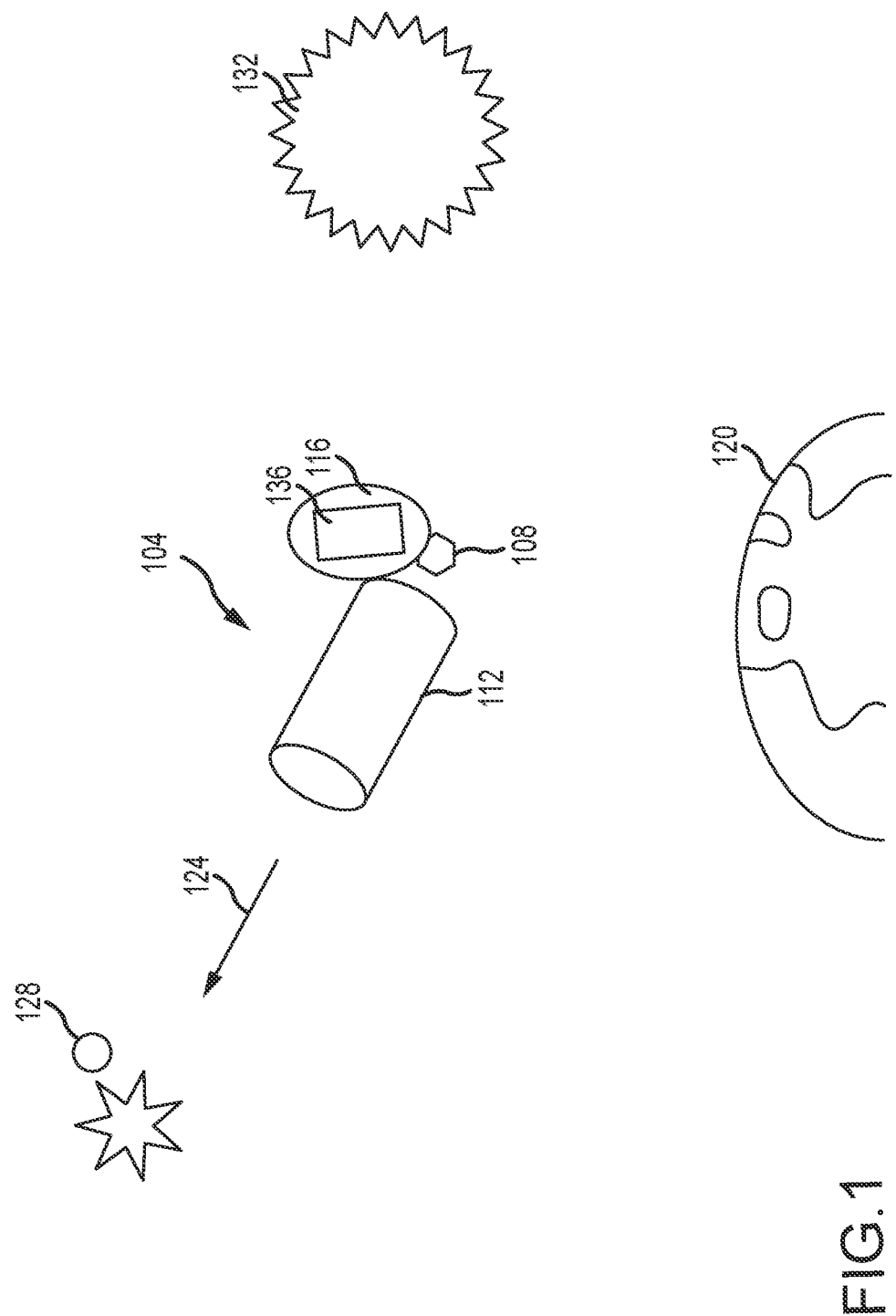
FIG. 1 depicts an example scenario incorporating a spacecraft having a spacecraft sunshade in accordance with embodiments of the present disclosure.

FIG. 1 depicts a spacecraft system 104 in an operational location in accordance with embodiments of the present disclosure. The spacecraft system 104 generally includes a spacecraft bus 108, an instrument 112, and a sunshade 116. As shown, the spacecraft system 104 may generally be deployed in orbit about the earth 120, or in deep space. In operation, the instrument 112 has a line of sight 124 that can be moved relative to the orientation of the spacecraft bus 108, to enable the instrument 112 to collect data from a selected area. As an example, but without limitation, the instrument 112 can be oriented such that the line of sight 124 is directed towards known or potential exoplanets 128. The sunshade 116 is generally positioned between the instrument 112 and the sun 132, to shade the instrument 112 from the direct rays of the sun 132. The sunshade 116 can thus provide stray light blocking or control in support of the instrument 112 operation and/or protection from solar heating due to direct exposure of the instrument 112 or other components of the spacecraft system 104 to solar radiation. The sunshade 116 can also be configured to re-radiate energy absorbed from the sun to the instrument 112 or other components of the spacecraft system 104, to provide heat to those components. In addition, and as discussed in greater detail elsewhere herein, the sunshade 116 can include one or more photovoltaic elements 136, from which electrical power can be produced.

Figure 2:
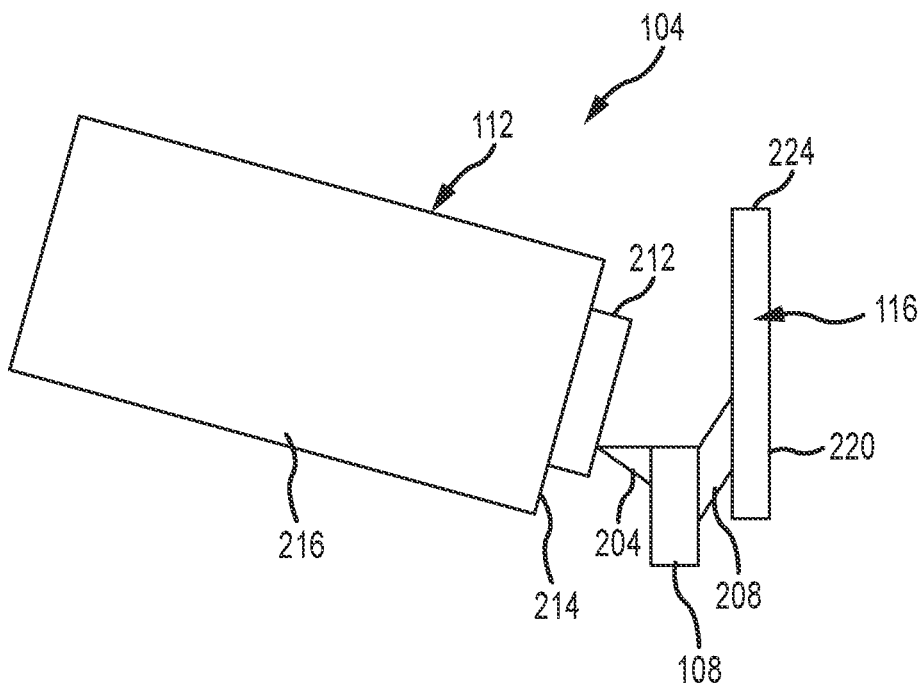
FIG. 2 is a side elevation view of a spacecraft and an included spacecraft sunshade in accordance with embodiments of the present disclosure.
Figure 3:
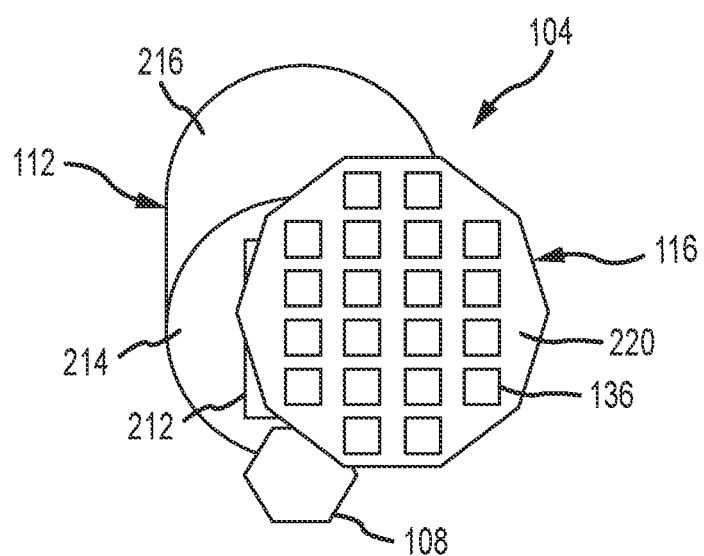
FIG. 3 is an end elevation view of a spacecraft and an included spacecraft sunshade in accordance with other embodiments of the present disclosure.

FIGS. 2 and 3 are side elevation and end elevation views respectively of an example spacecraft system 104 in accordance with embodiments of the present disclosure. As shown in the figures, various components of the spacecraft system 104 can be connected to the spacecraft bus 108. For example, the instrument 112 can be connected to the spacecraft bus 108 by a mechanical linkage or actuator assembly 204, also referred to herein as the instrument actuator assembly 204, that enables the instrument line of sight 124 to be moved relative to the spacecraft bus 108, and in particular to direct the line of sight 124 towards a selected area. In accordance with at least some embodiments of the present disclosure, the instrument actuator assembly 204 enables the instrument 112 to be selectively rotated about the X and Y axes of the spacecraft bus 108. Similarly, the sunshade 116 can be connected to the spacecraft bus 108 by another mechanical linkage or actuator assembly 208, also referred to herein as the sunshade actuator assembly 208. In accordance with at least some embodiments of the present disclosure, the sunshade actuator assembly 208 enables the sunshade 116 to be translated within a plane defined by the X and Y axes of the spacecraft bus 108. In accordance with still other embodiments of the present disclosure, various components of the spacecraft system 104 need not be mechanically connected to one another. Instead, relative positions of, for example, the spacecraft bus 108, the instrument 112, and/or the sunshade 116 can be maintained by thrusters. Actuator assemblies 204 and 208 can include, but are not limited to, linear actuators, rotary actuators, and four bar linkages, and can incorporate pistons, linear motors, stepper motors, or other motors in combination with linkages that include flexures, pivots, hinges, arms, booms, or the like.

The instrument 112 can, for example, include an instrument package 212, a mirror or optical package 214, and an instrument light shield or baffle 216. The instrument package 212 can include one or more sensors, including but not limited to a sensor operable to detect light within a range of wavelengths. As an example, the instrument package 212 can include a focal plane array that detects light within a range of wavelengths that extends from the infrared to the ultraviolet. The optical package 214 can, for example, comprise a telescope. In general, optimum operation of the instrument 112 requires that it be shielded from direct sunlight, and that it be maintained within a selected temperature range. In accordance with at least some embodiments of the present disclosure, the instrument package 212 is operable within a range of temperatures (e.g., from about 40K to about 300K° C.), while the optical package 214 can be operable within the same or a different range of temperatures (e.g., from about 280K to about 300K).

The sunshade 116 generally includes a front, light incident or sun facing surface 220, and a rear or heat radiating surface 224. The front 220 and rear 224 surfaces can be planar, curved, or faceted. The perimeter of the surfaces 220 and 224 can be circular, elliptical, rectangular, or any other shape. In accordance with embodiments of the present disclosure, one or more photovoltaic elements 136 are disposed on the sun facing surface 220. As can be appreciated by one of skill in the art, the photovoltaic elements 136 are operable to generate electrical power from sunlight incident thereon. In accordance with embodiments of the present disclosure, the sunshade 116 is opaque, to provide a light blocking function. In accordance with further embodiments of the present disclosure, the sunshade provides a thermal mass that absorbs heat from the sun and reradiates at least some of that absorbs heat to or towards the instrument 112, to provide a heating function. The sunshade 116 can be formed from a single integral panel, multiple layered panels, support structures in combination with a single panel or multi layered panel, or the like. A multilayered panel can incorporate honeycomb or spacer layers. Moreover, the sunshade 116 can be formed as a segmented panel. Materials for forming a sunshade 116 can include, but are not limited to, aluminum, mylar, Kapton, and foils. The sun facing surface 220 and/or substrates or layers supporting or underlying the sun facing surface 220 are formed from opaque materials, providing a light blocking function. In accordance with embodiments of the present disclosure, the sunshade 116 is configured to support the plurality of photovoltaic elements 136 located on the sun facing surface 220. As can be appreciated by one of skill in the art after consideration of the present disclosure, the particular construction of the sunshade 116 can take into account the deployed size of the sunshade, constraints of the launch vehicle, and the like. For example, a relatively small sunshade may be formed from a rigid, aluminum honeycomb structure, while relatively large substrate may be formed from a multi-segmented set of rigid or flexible panels. Accordingly, a sunshade 116 in accordance with embodiments of the present disclosure can perform light blocking, electrical power generation, and heating functions. In accordance with at least some embodiments of the present disclosure, the sunshade 116 is relatively small. For instance, the sun facing surface 220 of the sunshade 116 may, in at least one dimension, have a size that is the same as or similar to a size of an area of the instrument 112 over which blocking incident light is required or desired. Accordingly, and as discussed in greater detail elsewhere herein, the sunshade 116 in accordance with embodiments of the present disclosure is moved with movement of the instrument 112 to ensure adequate light blocking.

Figure 4:
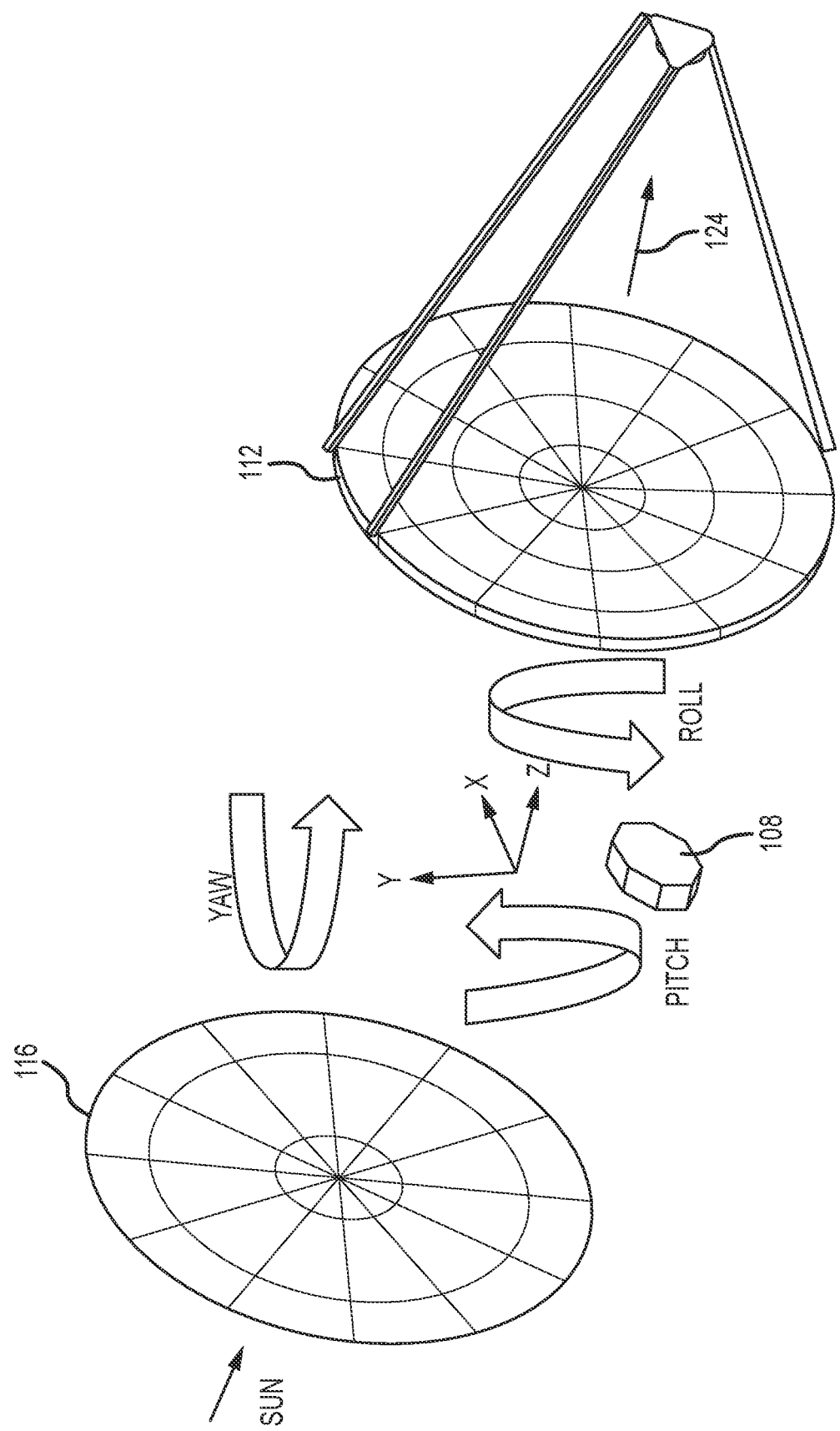
FIG. 4 depicts an orientation system for a spacecraft system in accordance with embodiments of the present disclosure.

With reference now to FIG. 4, an orientation system for a spacecraft system 104 in accordance with embodiments of the present disclosure is illustrated. In particular, the orientation system can be defined with reference to the spacecraft bus 108. As shown, the X-axis is defined as the pitch axis, the Y-axis is defined as the yaw axis, and the Z-axis is defined as the roll axis.

In general, and as discussed in greater detail elsewhere herein, the alignment of the instrument 112 relative to the spacecraft bus 108 can be changed, in order to direct the instruments line of sight 124 towards different areas of interest. More particularly, the alignment of the instrument 112 can be changed by selectively rotating the instrument 112 about the X and/or Y axes (or relative to the X and Y axes). Selective rotation of the instrument 112 about the Z-axis is also possible, for example where an instrument 112 sensor is asymmetric about the Z-axis.

As noted, it is desirable to move the relatively small sunshade 116, in order to maintain desired or required light blocking functions for the instrument 112. In accordance with embodiments of the present disclosure, such movements are performed as a translation within the X-Y plane (or within a plane parallel to the X-Y plane). In accordance with further embodiments of the present disclosure, the sunshade 116 can be translated within other planes or rotated about various axes. Moreover, an orientation of the sunshade 116 relative to the spacecraft bus 108 is determined by the orientation of the instrument 112 relative to the spacecraft bus 108.

Figure 5:
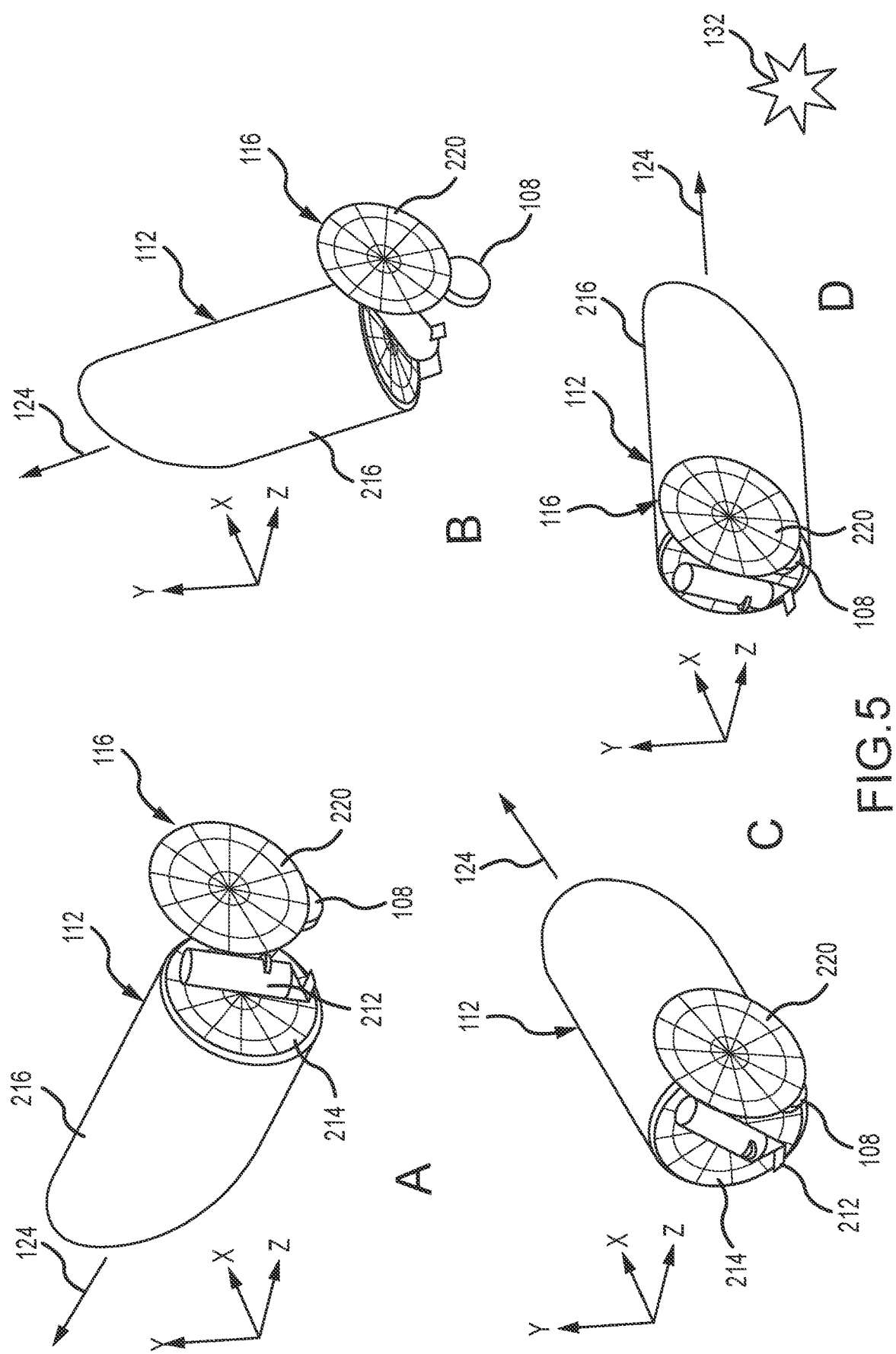
FIG. 5 depicts example positions of a sunshade relative to an instrument in accordance with embodiments of the present disclosure.

FIG. 5 depicts example positions of a sunshade 116 relative to an instrument in accordance with embodiments of the present disclosure. In each of the different scenarios, labeled A, B, C and D, the line of sight 124 of the instrument 112 is oriented differently, thereby placing components of the instrument 112 in a different position relative to the spacecraft bus 108. In order to maintain adequate shading for the components of the instrument 112 requiring such shading, the position of the sunshade 116 relative to the spacecraft bus 108 is adjusted. In accordance with embodiments of the present disclosure, the adjustment of the position of the sunshade 116 relative to the spacecraft bus 108 is made within the X-Y plane. However, in all of the various positions, the sunshade 116, and in particular the light incident surface 220, maintains an orientation that is generally facing towards the sun 132. In particular, where the light incident surface 120 defines a particular surface area, an amount of light blocking area presented to the rays of the sun 132 is greater than half of that surface area. In accordance with other embodiments of the present disclosure, the amount of light blocking area presented to the rays of the sun 132 is greater than 80% of the area of the light incident surface 220.

Figure 6:
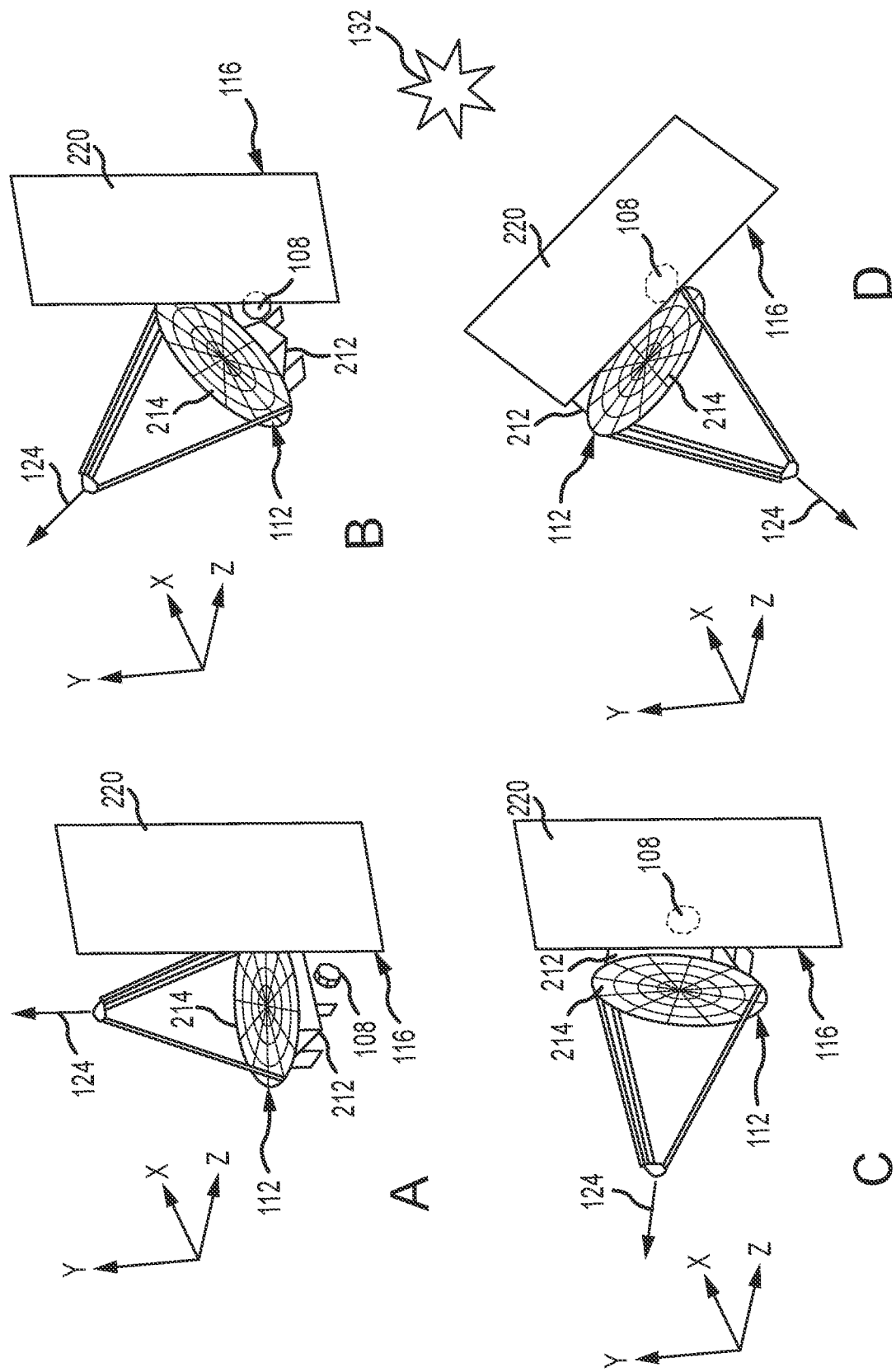
FIG. 6 depicts example positions of a sunshade relative to an instrument in accordance with other embodiments of the present disclosure.

FIG. 6 depicts example positions of a sunshade 116 relative to an instrument in accordance with other embodiments of the present disclosure. As in the previous figure, in each of the different scenarios, labeled A, B, C and D, the line of sight 124 of the instrument 112 is oriented differently, thereby placing components of the instrument 112 in a different position relative to the spacecraft bus 108. However, FIG. 6 differs in that it illustrates a spacecraft system 104 with a sunshade 116 having an asymmetric light incident surface 220 (c.f. the examples of FIG. 5, in which the sunshade 116 surface 220 is symmetrical). Also, in D of the figure, an example of a movement of the sunshade 116 about the Z or roll axis is depicted. In addition, the instrument 112 in this example does not include an instrument shade 216, and instead relies entirely on the sunshade 116 to block incident sunlight and provide protection from stray light.

Figure 7:
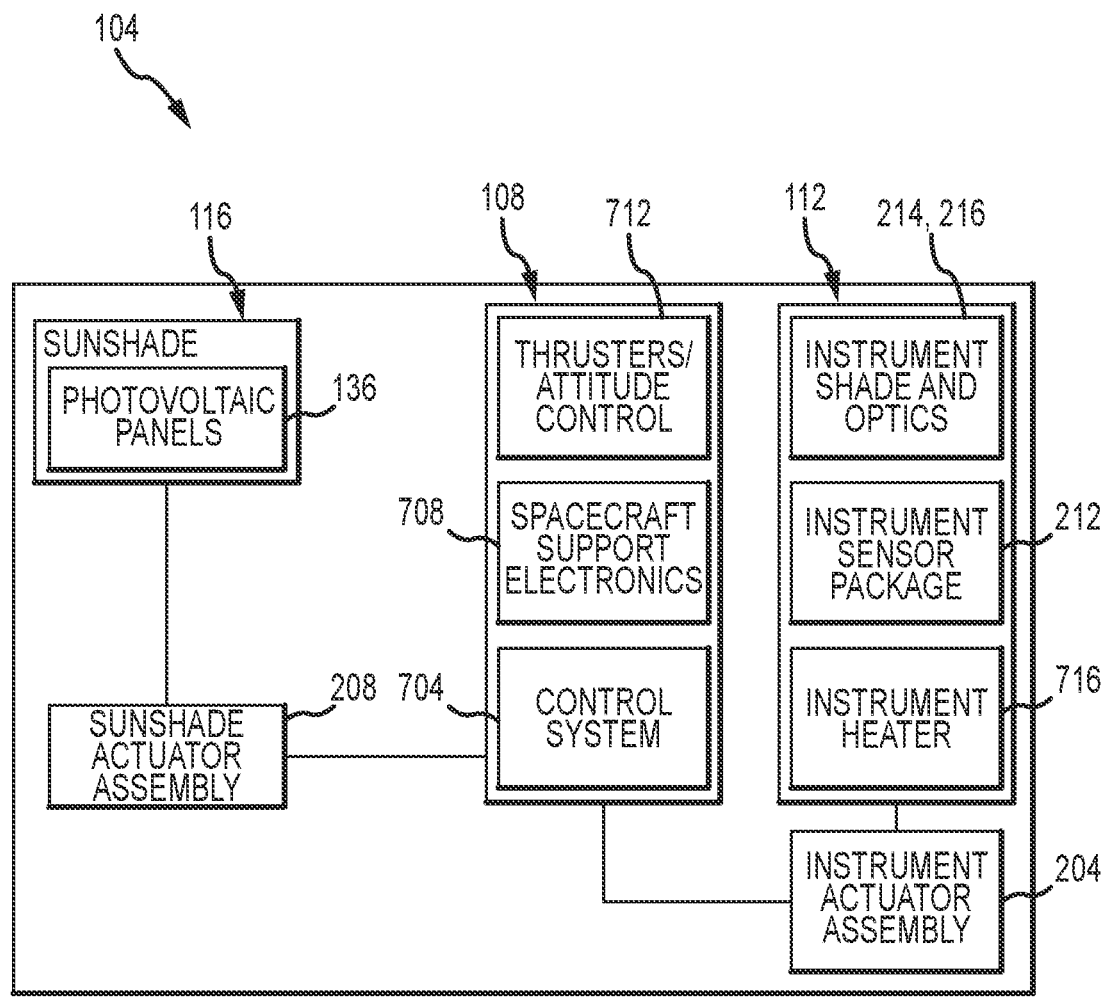
FIG. 7 is a block diagram depicting components of a spacecraft system in accordance with embodiments of the present disclosure.

FIG. 7 is a block diagram depicting components of a spacecraft system 104 in accordance with embodiments of the present disclosure. As discussed herein, the spacecraft system 104 generally includes the spacecraft bus 108, the instrument package 112, and the sunshade 116. In the embodiment illustrated in this figure, the instrument package 112 is physically connected to the spacecraft bus 108 by an instrument actuator assembly 204. As examples, but without limitation, the instrument actuator assembly 204 can include one or more actuator arms, pivots, and motors. Moreover, the instrument actuator assembly 204 can enable movement of the instrument package 112 about any or all of the pitch, roll, or yaw axes. In this embodiment, the sunshade 116 is physically connected to the spacecraft bus 108 by a sunshade actuator assembly 208. As examples, but without limitation, the sunshade actuator assembly 208 can include one or more actuator arms, pivots, and motors. In accordance with the least some embodiments of the present disclosure, the sunshade actuator assembly 208 enables translational movement of the sunshade 116 within the X-Y plane. In accordance with further embodiments of the present disclosure, the sunshade actuator assembly 208 limits movement of the sunshade 116 to translational movements within the X-Y plane. In accordance with still further embodiments of the present disclosure, the sunshade actuator assembly 208 can additionally enable movement of the sunshade 116 about any or all of the pitch, roll, or yaw axes.

In this example, the spacecraft bus 108 can include a control system 704, spacecraft support electronics 708, and thrusters 712. The control system 704 can include one or more processors, memory, data storage, and other components that operate to run application programming stored therein in connection with operation of the spacecraft system 104. The operations of the spacecraft system 104 controlled by the control system 704 can include operation of the spacecraft support electronics 708 to maintain required operating parameters, support communications with ground stations, other spacecraft, or the like. The control operations can further include operation of the thrusters 712 to maintain the spacecraft bus 108 at a desired orientation or orbit. As examples, but without limitation, the thrusters 712 can include propellant thrusters, ion thrusters, or the like. As a further example, the control system 704 can operate momentum wheels for attitude control.

The control system 704 can also operate or control operation of the instrument actuator assembly 204 to point the line of sight 124 of the instrument 112 at a desired area, and can further include operate or control operation of the sunshade actuator assembly 208 to position the sunshade 116 such that the instrument 112 is shaded from the sun 132. In accordance with embodiments of the present disclosure, the control system 704 can include a table or algorithm that is referenced or applied to determine the position of the sunshade 116 that is required in order to fully shade the instrument 112 for a given instrument 112 alignment. That is, the position of the sunshade 116 required to block incident light from impinging on the instrument 112 directly can be determined from the alignment of the instrument 112.

The instrument 112 can additionally be associated with an instrument heater 716. Power for operating the instrument heater 716 can be supplied by the photovoltaic panels 136 included in the sunshade 116. Notably, the amount of heat required from the instrument heater 716 can be reduced or eliminated by supplying radiant heat to the instrument 112 from the sunshade 116. Accordingly, the instrument heater 716 can be used for fine temperature control, while the bulk of the heating required by the instrument 112 can be supplied as heat radiated from the sunshade 116.

Figure 8:
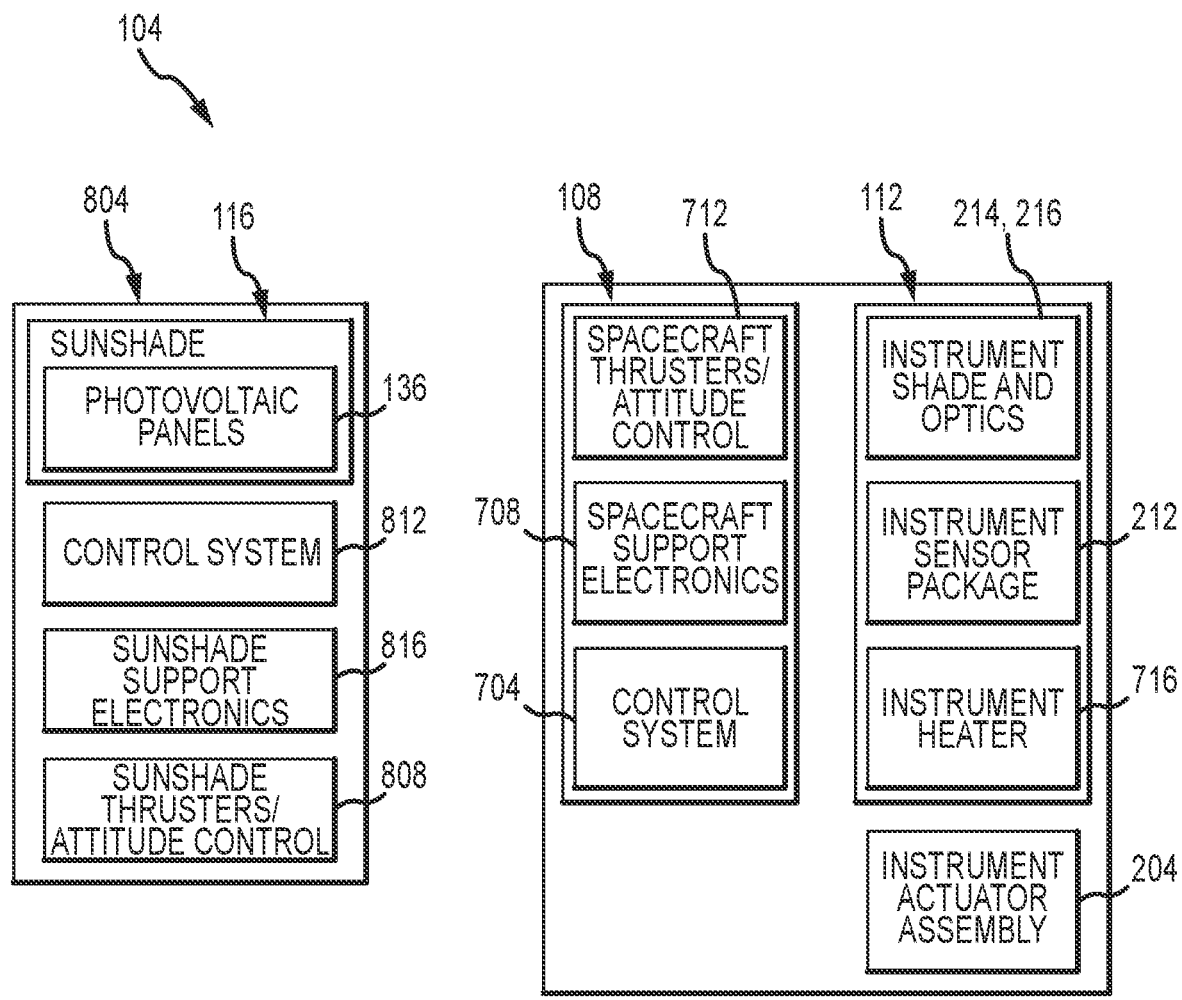
FIG. 8 is a block diagram depicting components of a spacecraft system in accordance with other embodiments of the present disclosure.

FIG. 8 is a block diagram depicting components of a spacecraft system 104 in accordance with other embodiments of the present disclosure. In this embodiment, no sunshade actuator assembly is included. Instead, the sunshade 116 is part of a sunshade package 804 that is separate from the spacecraft bus 108 and the instrument 112. The sunshade package 804 includes sunshade thrusters and/or attitude control mechanisms 808 to maintain a desired position of the sunshade 116 relative to the instrument 112. Accordingly, the sunshade package 804 can be entirely free flying relative to the spacecraft bus 108 and the instrument 112. Alternatively or in addition, for example to supply power from the photovoltaic panels 136 of the sunshade 116 to the spacecraft bus 108, an umbilical cord that includes power supply cables and that interconnects the sunshade package 804 to the spacecraft bus 108 can be provided. In accordance with still further embodiments, multiple sunshade packages 804 can be included in the spacecraft system 104. As in other embodiments, the position of the sunshade 116 is controlled to maintain the necessary shading effect for the instrument 112, except in this embodiment the sunshade thrusters/attitude control mechanism 808 is operated to place the sunshade 116 in the correct position, depending on the alignment of the instrument 112. Operation of the sunshade thrusters/attitude control 808 may be implemented by a sunshade package control system 812 independently or at least partially at the direction of the spacecraft control system 704. The sunshade package 804 can additionally include sunshade support electronics 816. The sunshade support electronics 816 can include batteries, communication systems, power supply cabling, and signal cabling.

Figure 9:
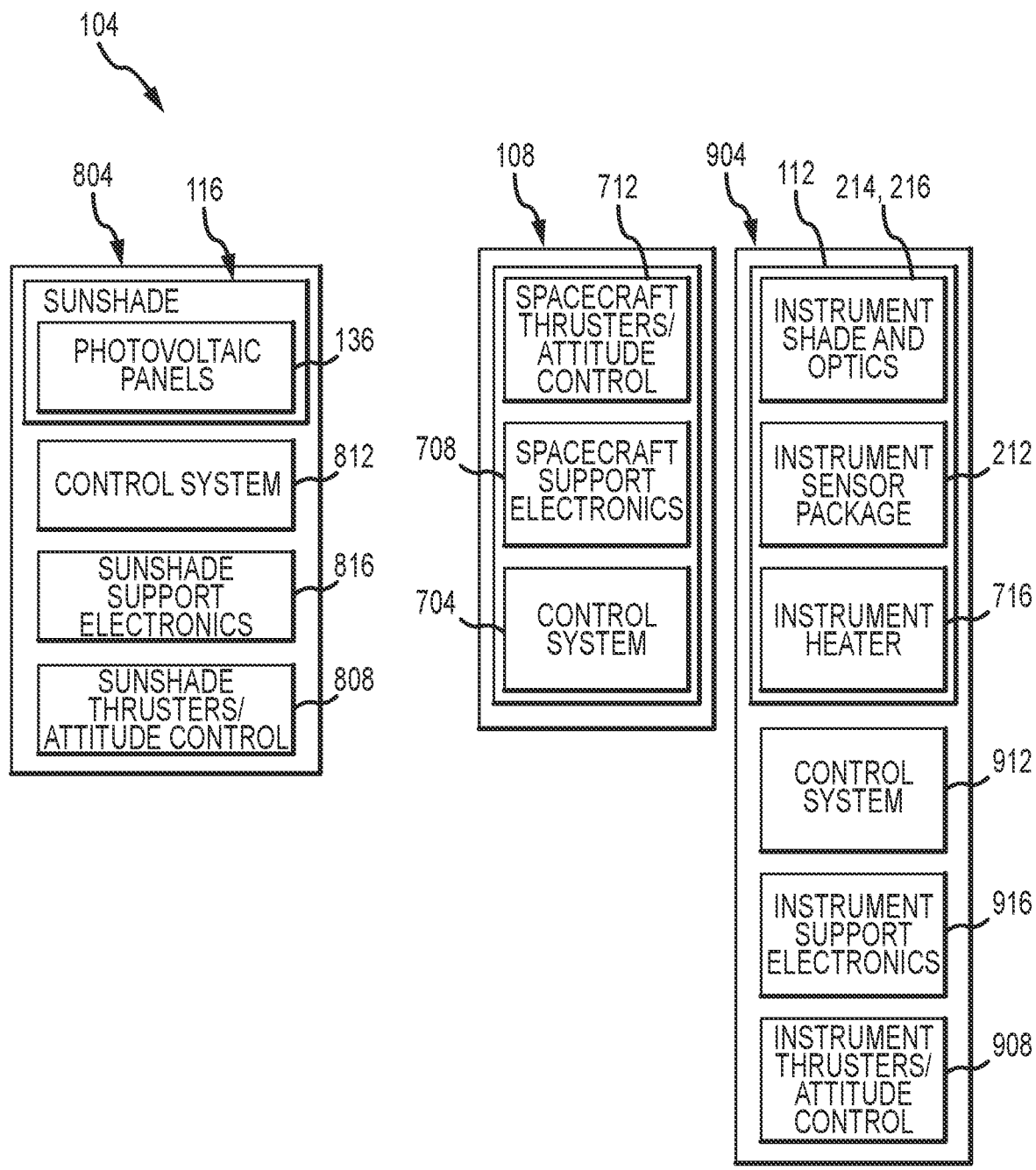
FIG. 9 is a block diagram depicting components of a spacecraft system in accordance with still other embodiments of the present disclosure.

FIG. 9 is a block diagram depicting components of a spacecraft system in accordance with still other embodiments of the present disclosure. In this embodiment, no instrument 204 or sunshade 208 actuator assemblies are provided. Instead, the sunshade 116 is provided as part of a sunshade package 804 that is separate from the spacecraft bus 108, and the instrument 112 is provided as part of an instrument package 904. In accordance with other embodiments that includes a free flying sunshade package 804, multiple separate sunshade packages 804 can be provided. The instrument package 904 includes thrusters and/or attitude control mechanisms 908 to point the line of sight 124 of the instrument 112 at a desired area, and to maintain a desired position of the instrument 112 relative to the spacecraft bus 108. Accordingly, the instrument package 904 can be entirely free flying relative to the spacecraft bus 108 and the sunshade 116. Optionally, an umbilical cord that interconnects the instrument package 904 to the spacecraft bus 108 can be provided, for example to provide power to the instrument package 912 and to pass control signals and data between the spacecraft bus 108 and the instrument package 904. Operation of the instrument thrusters/attitude control mechanisms 908 may be implemented by an instrument package control system 912, independently or at least partially at the direction of the spacecraft control system 704. In addition to control of the instrument thrusters/attitude control mechanisms 908, the instrument package control system 912 can control operation of the instrument 112, and the collection and storage of instrument 112 data. The instrument package 904 can additionally include instrument support electronics 916, which can include batteries, communication systems, power supply cabling, signal cabling, and the like. As yet another alternative, a spacecraft system 104 can include a free flying instrument package 904 and a sunshade 116 that is joined to a spacecraft bus 108 by an actuator assembly 208.

Figure 10:
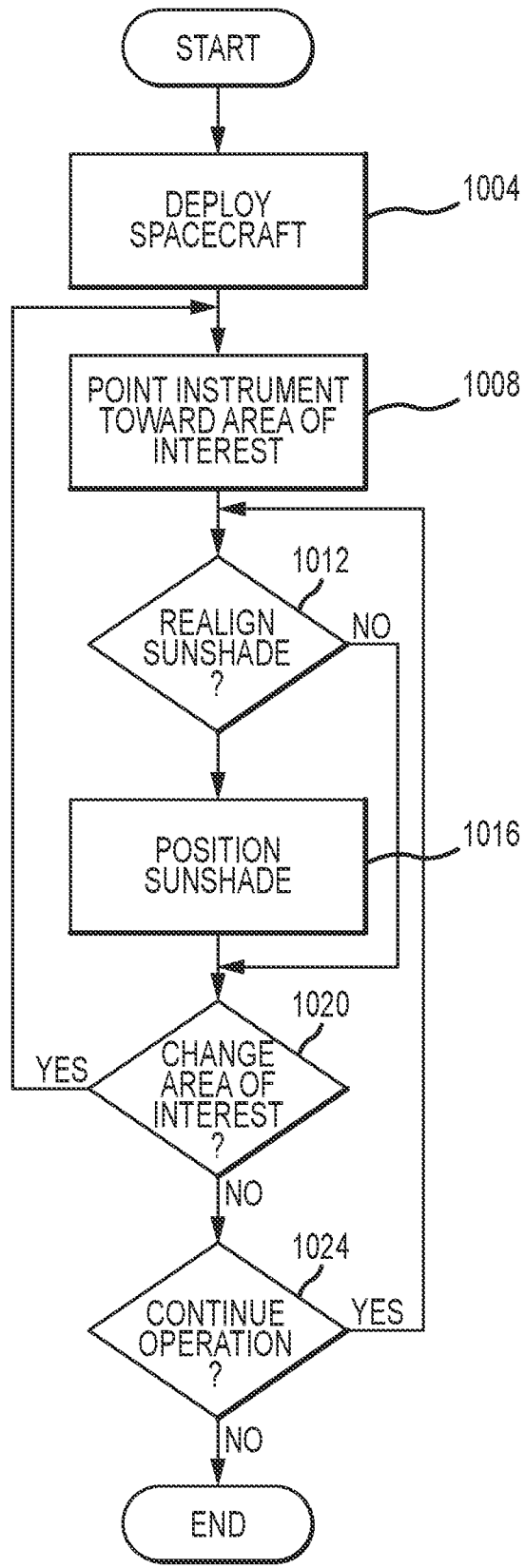
FIG. 10 is a flowchart illustrating aspects of a method for providing a multiple function spacecraft sunshade in accordance with embodiments of the present disclosure.

FIG. 10 is a flowchart illustrating aspects of a method for providing a multiple function spacecraft sunshade in accordance with embodiments of the present disclosure. Initially, the spacecraft system 104 is deployed to an operational location (step 1004). In addition to launching the spacecraft and delivering it to a desired location, deploying can include separating the spacecraft system 104 from a launch vehicle, and placing the various components in operational positions. Placing components in operational positions can include extending and or pivoting actuators, including but not limited to instrument 204 and sunshade 208 actuators, to move components into operational position, unfolding and opening components, and the like. As examples, but without limitation, the operational location can include an Earth orbit, a Lagrange point, or a location in or a trajectory through space. At step 1008, an instrument 112 line of sight 124 is pointed toward an area of interest. Where the instrument 112 is connected to the spacecraft bus 108 by an instrument actuator assembly 204, pointing the line of sight 124 toward the area of interest can include operating stepper motors included in the actuator assembly 204 to achieve the desired pointing, while the orientation of the spacecraft bus 108 remains constant. As examples, but without limitation, any area of interest can encompass a known or suspected location of a planetary system, a star, a planet, an asteroid, a galaxy, or any other astrological feature or area.

A determination can be made as to whether a realignment of the sunshade 116 from its current position is necessary to shade the instrument 112 in the current or next instrument line of sight 124 pointing direction (step 1012). More particularly, for a given alignment of the instrument 112 line of sight 124, and a given location of the sun 132 or other source of interfering or potentially interfering light relative to the spacecraft system 104, an optimal position for the sunshade 116 relative to the instrument 112 can be determined. An optimal position can thus be a position that provides required stray light control to the optical components 216 of the instrument 112. In addition, an optimal position for the sunshade can include a position that provides a selected amount of shading to the instrument 112 or other components of the spacecraft system 104, in order to shield such components from direct exposure to radiation from the sun 132, thereby preventing undesired heating or overheating of such components.

As can be appreciated by one of skill in the art after consideration of the present disclosure, and depending on the area of the sunshade 116 effectively presented to the sun 132, the area of the instrument 112 requiring shading, and the proximity of the sunshade 116 to the instrument 112, a single sunshade 116 alignment can serve to adequately shield the instrument 112 over a range of instrument line of sight 124 alignments. Accordingly, not every initial instrument 112 alignment, and not every adjustment to the instrument 112 alignment will necessarily require a realignment of the sunshade 116. As can also be appreciated by one of skill in the art after consideration of the present disclosure, for a spacecraft system 104 with predetermined operating parameters, the optimal position of the sunshade 116 for different instrument line of sight 124 alignments can itself be predetermined and stored. Accordingly, the determination of a desired or adequate sunshade 116 alignment for a given instrument 112 alignment can be made by reference to a set of stored values (e.g., in a table), through calculation, operation of the feedforward control system, or the like. In addition to optimal relative alignments of the sunshade 116 and the instrument 112, adequate or sufficient alignments can be stored or calculated. An optimal alignment can differ from a sufficient alignment in that an optimal alignment can position the sunshade 116 such that the area of the instrument 112 to be protected is centered in the resulting shadow, while a sufficient alignment may be such that a sufficient or critical area of the instrument 112 is within the shadow created by the sunshade 116.

In accordance with embodiments of the present disclosure, alignment of the sunshade 116 is confined to movement within the X-Y plane. In particular, at least some embodiments of the present disclosure do not rotate the sunshade 116 about the X or the Y axes. In addition, the sunshade 116 is generally maintained in an orientation in which the light incident surface 220 is normal to the sun. In accordance with other embodiments, the sunshade 116 is maintained in an orientation in which the light incident surface 220 is normal to the sun, within some small tolerance range (e.g., within a range of about ±5°). Alternatively, the sunshade 116 can be maintained in an orientation in which the light incident surface 220 is substantially normal to the sun 132, such that a majority of the effective area of the light incident surface 220, which corresponds to the area of the shadow cast by the sunshade 116, is normal to the sun 132. As can be appreciated by one of skill in the art after consideration of the present disclosure, where the sunshade 116 is connected to the spacecraft bus 108 by a sunshade actuator assembly 208 that limits movement of the sunshade 116 to translational movements within the X-Y plane, the alignment of the light incident surface 220 relative to the sun 132 can be maintained through station keeping operations performed by thrusters and attitude control components 712 of the spacecraft bus 108.

In accordance with embodiments of the present disclosure, the sunshade 116 is configured and operated to provide radiational heating. In particular, the sunshade is configured to absorb energy from the sun 132, and to reradiate that energy as heat to the instrument 112. The sunshade 116 can thus be operated to passively provide heating simply by being in proximity to the instrument 112. In accordance with embodiments of the present disclosure, the proximity of the sunshade 116 to the instrument 112 can be varied by moving the sunshade 116 along the Z axis, with the sunshade 116 moved closer to the instrument 112 to increase the amount of radiational heating, and with the sunshade 116 moved farther away from the instrument to decrease the amount of radiational heating. Operating the sunshade 116 to provide radiational heating can include absorbing heat energy at the light incident surface 220, conducting that heat through the sunshield 116 core, and re-radiating that heat from the rear surface 224, which generally faces the instrument 112, to the instrument 112.

In addition to shading an instrument 112 from direct sunlight, and in addition to providing infrared radiation heating, a sunshade 116 in accordance with embodiments of the present invention can be operated to provide electrical power. More particularly, the photovoltaic elements 136 on the light incident surface 220 of the sunshade 116 generate electrical power that can be used for various spacecraft system 104 functions. Such functions can include operating an instrument heater 716. More particularly, the instrument heater 716 can provide fine temperature control for the instrument 112 components. As can be appreciated by one of skill in the art after consideration of the present disclosure, where the sunshade 116 is configured and operated to provide radiational heating to the instrument 112, the instrument heater 716 can be smaller and/or can require less electrical power than if such infrared radiation heating were not supplied.

If required, a realignment or positioning of the sunshade 116 is then performed (step 1016). After realigning the sunshade 116, or after determining that realignment is not required, a determination can be made as to whether the area of interest has changed, thereby requiring a realignment of the instrument 112 line of sight 124 (step 1020). If the area of interest has changed, the process can return to step 1008, and the instrument 112 can be pointed to the new area of interest. If the area of interest has not changed, a determination can be made as to whether operation of the instrument 112 and sunshade 116 alignment process is to continue (step 1024). If operation is to continue, the process can return to step 1012 at which the alignment of the sunshade 116 can be checked. If the process is to be discontinued, for instance for maintenance or decommissioning, the process can end.

In accordance with at least some embodiments of the present disclosure, and as illustrated in FIGS. 8 and 9, various spacecraft system 104 components can be free flying relative to one another. In such embodiments, pointing of the instrument 112 line of sight 124 and/or positioning of the sunshade 116 can be performed through operation of the thrusters and attitude control components 808 or 908 of the respective component. In accordance with still other embodiments of the present disclosure, multiple instances of various components can be included in the spacecraft system 104. For instance, multiple sunshades 116 can be provided and operated in a cooperative fashion to provide desired shading and/or heating for an associated instrument 112. As another example, multiple instruments 112 can be shaded, heated, or shaded and heated by one or more sunshades 116.

A sunshade 116 as described herein can thus provide one or more functions. These functions can include shading spacecraft system 104 components from the sun 132, generating electrical power, and providing radiational heating, and any one, two, or all three such functions can be performed by the sunshade 116 at any one time. Moreover, as part of shading spacecraft system 104 components from the sun 132, the orientation of the sunshade 116 can be controlled to provide stray light blocking for the instrument 112, and in particular for instrument optical components 214, including but not limited to mirrors and lenses, and sensor 212 components. Alternatively or in addition, performing shading spacecraft system 104 components from the sun 132 can include controlling an orientation of the sunshade to shield some or all of the instrument 112 and/or other spacecraft system 104 components from direct exposure to radiation from the sun, preventing extreme heating of such components. The generation of electrical power is provided by disposing photovoltaic elements 136 on the light incident surface 220 of the sunshade 116. The provision of radiational heating includes constructing the sunshade 116 so that heat energy is absorbed at the light incident surface 220, is conducted through the light shade 116 structure, and is then re-radiated from the rear surface 224. As can be appreciated by one of skill in the art after consideration of the present disclosure, the construction and sizing of the sunshade 116 can therefore take into consideration the size of the shadow required by the light blocking and stray light control functions, the amount of electrical power required to be generated by the sunshade 116, and the amount of radiational heating to be supplied by the sunshade 116.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method, comprising:
   placing an instrument in a location in orbit about the Earth or in space to collect data from a selected area;
   pointing the instrument in a first direction;
   positioning a sunshade at a first location in proximity to the instrument and such that the sunshade blocks at least a portion of the instrument from direct sunlight while the instrument is pointed in the first direction;
   pointing the instrument in a second direction;
   positioning the sunshade at a second location in proximity to the instrument and such that the sunshade blocks at least a portion of the instrument from direct sunlight while the instrument is pointed in the second direction;
   absorbing radiant heat from the sun using the sunshade; and
   radiating at least some of the absorbed heat from the sunshade to the instrument, wherein a proximity of the sunshade to the instrument can be varied to maintain the instrument within a range of instrument operating temperatures, wherein the proximity of the sunshade to the instrument is decreased to provide increased radiational heating of the instrument, and wherein the proximity of the sunshade to the instrument is increased to provide decreased radiational heating of the instrument.

2. The method of claim 1, wherein the first location of the sunshade corresponds to a first location within a first plane, and wherein the second location of the sunshade corresponds to a second location within the first plane.

3. The method of claim 2, further comprising:
   producing electrical power from photovoltaic elements located on a surface of the sunshade facing the sun.

4. The method of claim 1, wherein positioning the sunshade at the first and second locations includes providing stray light protection to the instrument.

5. The method of claim 4, wherein positioning the sunshade at the first and second locations includes blocking incident sunlight to prevent overheating of the instrument.

6. The method of claim 5, wherein the instrument includes a telescope that operates at room temperature.

7. The method of claim 5, further comprising:
   providing a heater system, wherein fine temperature control of the instrument is performed by the heater system.

8. The method of claim 2, wherein positioning the sunshade at the first and second locations includes providing stray light protection to the instrument.

9. The method of claim 3, wherein positioning the sunshade at the first and second locations includes providing stray light protection to the instrument.

10. The method of claim 2, wherein the first plane is normal to the sun.

11. The method of claim 10, wherein the sunshade and the instrument are mounted to a spacecraft bus, wherein a light incident surface of the sunshade is normal to the sun, and wherein movement of the sunshade relative to the spacecraft bus is limited to movement within the first plane.

12. A spacecraft, comprising:
    an instrument;
    a sunshade;
    a first mechanical linkage; and
    a spacecraft bus, wherein an alignment of a line of sight of the instrument within at least a first range is independent of an alignment of the spacecraft bus, wherein the sunshade is mounted to the spacecraft bus by the first mechanical linkage, wherein the mechanical linkage allows the sunshade to be moved between at least first and second positions relative to the instrument, wherein a movement of the sunshade between the first and second positions is a translational movement in a first plane, and wherein movement of the sunshade relative to the spacecraft bus is limited to the first plane.

13. The spacecraft of claim 12, wherein at least a majority of an effective area of the sunshade is parallel to the first plane.

14. The spacecraft of claim 13, wherein in an operational state the at least a majority of the effective area of the sunshade is normal to the sun.

15. The spacecraft of claim 14, wherein, with the line of sight of the instrument pointed in a first direction, the sunshade is positioned at a first location within the first plane, and wherein, with the line of sight of the instrument pointed in a second direction, the sunshade is positioned at a second location within the first plane.

16. The spacecraft of claim 12, wherein the sunshade includes a plurality of photovoltaic elements.

17. The spacecraft of claim 16, wherein the sunshade is configured to absorb heat from the sun and to re-radiate heat to the instrument.

18. The spacecraft of claim 12, further comprising:
    a second mechanical linkage, wherein the instrument is mounted to the spacecraft bus by the second mechanical linkage.

19. A spacecraft system, comprising:
    a spacecraft bus;
    an instrument;
    an instrument attitude controller, wherein the instrument attitude controller is operable to point the instrument towards a volume of interest;
    a sunshade; and
    one of a sunshade actuator assembly and a sunshade attitude controller, wherein the one of a sunshade actuator assembly and a sunshade attitude controller is operable to position the sunshade to at least partially shade the instrument from the sun, wherein the sunshade is configured to radiate energy absorbed from the sun as heat that is supplied to the instrument, wherein the one of a sunshade actuator assembly and a sunshade attitude controller is further operable to vary a proximity of the sunshade to the instrument to maintain the instrument within a range of instrument operating temperatures, wherein the proximity of the sunshade to the instrument is decreased to provide increased radiational heating of the instrument, and wherein the proximity of the sunshade to the instrument is increased to provide decreased radiational heating of the instrument.

20. The system of claim 19, wherein the sunshade includes a plurality of photovoltaic elements on a light incident side of the sunshade.

21. The system of claim 19, wherein the instrument includes an optical package.

22. The system of claim 21, wherein the optical package includes a telescope.

23. The system of claim 19, wherein the instrument is joined to the spacecraft bus by an instrument actuator assembly.

24. The system of claim 19, wherein the one of a sunshade actuator assembly and a sunshade attitude controller is a sunshade actuator assembly.

\* \* \* \* \*